United States Patent
Nishiyama

(10) Patent No.: US 9,742,733 B2
(45) Date of Patent: Aug. 22, 2017

(54) COMMUNICATION DEVICE, COMMUNICATION SYSTEM, AND COMMUNICATION DEVICE CONTROL METHOD

(71) Applicant: KYOCERA Document Solutions Inc., Osaka-shi (JP)

(72) Inventor: Masahiro Nishiyama, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 164 days.

(21) Appl. No.: 14/803,940

(22) Filed: Jul. 20, 2015

(65) Prior Publication Data

US 2016/0028690 A1 Jan. 28, 2016

(30) Foreign Application Priority Data

Jul. 24, 2014 (JP) .................................. 2014-150562

(51) Int. Cl.
*H04L 29/06* (2006.01)
*G06F 3/12* (2006.01)

(52) U.S. Cl.
CPC ........ *H04L 63/0236* (2013.01); *G06F 3/1285* (2013.01); *H04L 63/0245* (2013.01); *H04L 63/0428* (2013.01); *H04L 63/0442* (2013.01); *H04L 63/168* (2013.01); *H04L 65/00* (2013.01); *H04L 65/105* (2013.01); *H04L 65/1069* (2013.01); *H04L 65/1073* (2013.01)

(58) Field of Classification Search
CPC ............... H04L 63/0442; H04L 65/105; H04L 65/1069; H04L 65/1073; H04L 63/0236; H04L 63/0245; H04L 63/0428; H04L 63/168; H04L 65/00; G06F 3/1285

USPC ............................................................ 726/9
See application file for complete search history.

(56) References Cited

U.S. PATENT DOCUMENTS

2007/0157309 A1* 7/2007 Bin ...................... H04L 63/0272
726/15
2011/0022723 A1* 1/2011 Inoue .................. H04N 1/32411
709/238

FOREIGN PATENT DOCUMENTS

JP H6-090253 A 3/1994
JP 2006277570 A 10/2006
(Continued)

OTHER PUBLICATIONS

An Office Action; "Notification of Reasons for Refusal" issued by the Japanese Patent Office on Jun. 7, 2016, which rresponds to Japanese Patent Application No. 2014-150562 and is related to U.S. Appl. No. 4/803,940; with English language translation.

*Primary Examiner* — Kambiz Zand
*Assistant Examiner* — Abiy Getachew
(74) *Attorney, Agent, or Firm* — Studebaker & Brackett PC

(57) ABSTRACT

A communication device includes a communication section and an encrypting section. When the communication section receives from a communication control device alternative address information indicating an address of an alternative device registered as a transfer destination after a communication request for communication with a specified device is transmitted to the communication control device, the communication section determines the alternative device as the communication partner and transmits to-be-transmitted data that is encrypted by the encrypting section to the alternative device. The transfer destination indicates a transfer destination of the data to be transmitted to the specified device.

8 Claims, 7 Drawing Sheets

(56) References Cited

FOREIGN PATENT DOCUMENTS

| JP | 2011-029820 A | 2/2011 |
|---|---|---|
| JP | 2012099963 A | 5/2012 |

\* cited by examiner

COMMUNICATION DEVICE, COMMUNICATION SYSTEM, AND COMMUNICATION DEVICE CONTROL METHOD

INCORPORATION BY REFERENCE

The present application claims priority under 35 U.S.C. §119 to Japanese Patent Application No. 2014-150562, filed Jul. 24, 2014. The contents of this application are incorporated herein by reference in their entirety.

BACKGROUND

The present disclosure relates to a communication device, a communication system, and a communication device control method.

A communication system employs a technique that utilizes a session initiation protocol (SIP) as a protocol for communication control. Note that SIP is defined in Request for Comments (RFC) 3261 of Internet Engineering Task Force (IETF) and the like. In the communication system utilizing the SIP, a SIP server working as a communication control device for communication control is connected to a plurality of communication devices (e.g., multifunction peripherals, facsimile machines, etc.) via a network.

The SIP server receives a communication request from a communication requester that requests communication. The SIP server that has received the communication request from the communication requester performs processing for establishing a session between the communication requester and a communication partner that the communication requester specifies. As a result, the communication requester can transmit and receive data to and from the communication partner.

Further, a communication device that is a possible communication partner (a user of a communication device) can perform transfer setting for setting another communication device as a transfer destination. In a situation in which the transfer setting is set, the SIP server establishes a session between the communication requester and the transfer destination. As a result, the transfer destination rather than the communication partner that the communication requester specifies receives the data from the communication requester.

SUMMARY

A communication device according to a first aspect of the present disclosure is for connection via a network to a communication control device that performs session establishing processing for establishing a session between the communication device and a communication partner. The communication device includes a communication section and an encrypting section. The communication section is configured to transmit a communication request to the communication control device for communication with a specified device specified as a communication partner by a user of the communication device and to transmit data to a communication partner with which a session is established through the session establishing processing. The encrypting section is configured to encrypt the data to be transmitted by the communication section. When the communication section receives from the communication control device alternative address information indicating an address of an alternative device registered as a transfer destination after the communication request for communication with the specified device is transmitted to the communication control device, the communication section determines the alternative device as the communication partner and transmits the to-be-transmitted data that is encrypted by the encrypting section to the alternative device. The transfer destination indicates a transfer destination of the data to be transmitted to the specified device.

A communication system according to a second aspect of the present disclosure includes a communication control device and the communication device according to the first aspect. The communication control section is configured to perform session establishing processing for establishing a session. The communication device is connected to the communication control device via the network.

A control method according to a third aspect of the present disclosure is a method for controlling a communication device connected via a network to a communication control device that performs session establishing processing for establishing a session between the communication device and a communication partner. The control method includes: transmitting to the communication control device a communication request for communication with a specified device specified as a communication partner by a user of the communication device; and transmitting to-be-transmitted data to a communication partner with which a session is established through the session establishing processing. When alternative address information indicating an address of an alternative device registered as a transfer destination is received from the communication control device after the communication request for communication with the specified device is transmitted to the communication control device, the transmitting to-be-transmitted data to a communication partner includes: determining the alternative device as the communication partner; and transmitting the to-be-transmitted data that is encrypted to the alternative device. The transfer destination indicates a transfer destination of the data to be transmitted to the specified device.

DETAILED DESCRIPTION

<Overall Configuration of Communication System>

Figure 1:
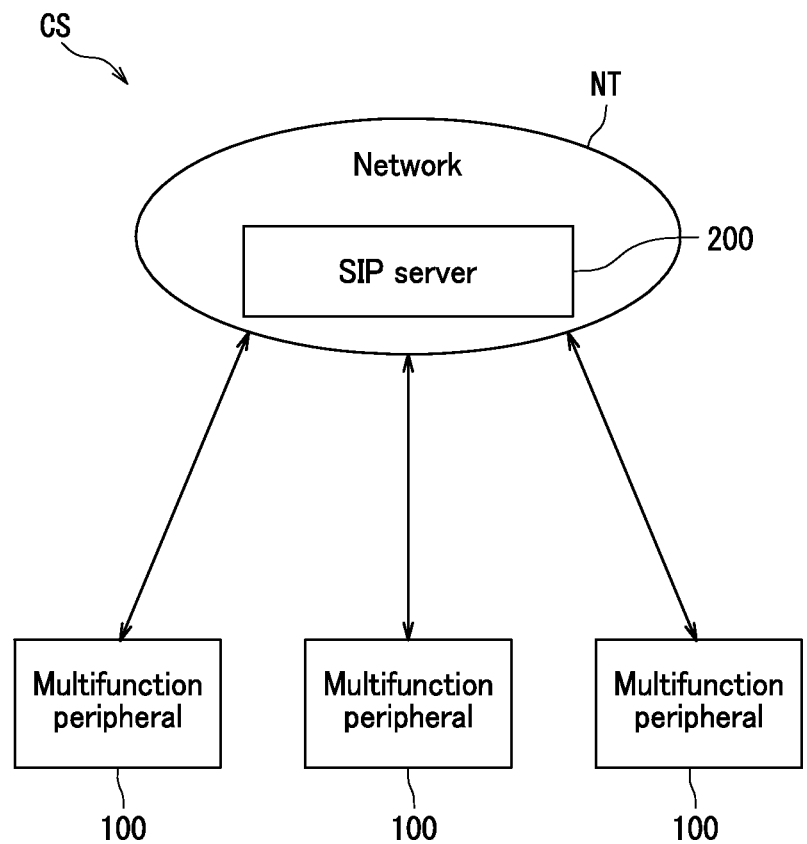
FIG. 1 is a schematic diagram of a communication system according to one embodiment of the present disclosure.

As illustrated in FIG. 1, a communication system CS according to the present embodiment includes a plurality of multifunction peripherals 100 and a SIP server 200. The elements included in the communication system CS are connected to one another in a communicable manner via a network NT to perform communication in accordance with a communication protocol described in SIR Note that the multifunction peripherals 100 each correspond to a communication device and the SIP server 200 corresponds to a communication control device.

Each of the communication devices included in the communication system CS is not limited in type specifically and may be a device having only a fax function rather than the multifunction peripheral 100. The number of the communication devices included in the communication system CS is not limited specifically. For example, although three multifunction peripherals 100 are illustrated as the communication devices in FIG. 1, four or more multifunction peripherals may be provided.

<Configuration of Each Device Included in Communication System>

Figure 2:
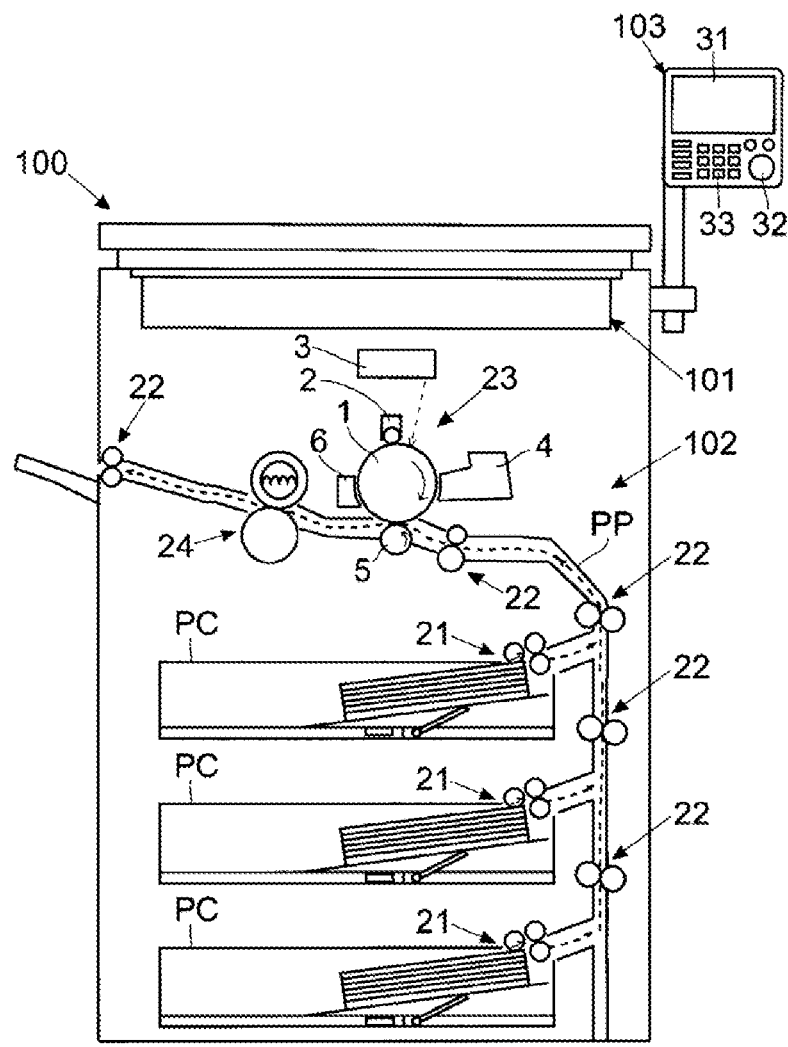
FIG. 2 is a schematic diagram of a multifunction peripheral included in the communication system according to one embodiment of the present disclosure.

As illustrated in FIG. 2, each of the multifunction peripherals 100 has a plurality of functions including a fax function and a copy function and includes an image reading section 101, a printing section 102, and an operation panel 103.

The image reading section 101 reads an original document to generate image data of the original document. Image data of the original document read by the image reading section 101 is for example subjected to various processing by a main control section 110, which will be described later. The image data serves as base data of fax data. Alternatively, the image data serves as base data of a print image in the printing section 102.

The printing section 102 includes a paper feed section 21, a paper conveyance section 22, an image forming section 23, and a fixing section 24. The paper feed section 21 feeds paper accommodated in a paper feed cassette PC to a paper conveyance path PP. The paper conveyance section 22 conveys the paper along the paper conveyance path PP. The image forming section 23 includes a photosensitive drum 1, a charger 2, an exposure device 3, a developing device 4, a transfer roller 5, and a cleaning device 6. The image forming section 23 forms a toner image based on the image data and transfers the toner image to the paper. The fixing section 24 applies heat and pressure to the transferred toner image to fix the toner image to the paper.

The operation panel 103 includes a liquid crystal display panel 31 with a touch panel. The liquid crystal display panel 31 displays a message and soft keys that receive various settings. The operation panel 103 also includes hard keys including a start key 32 and a numeric keypad 33.

Note that the multifunction peripherals 100 may have the same configuration or different configurations. The following description supposes an example in which the multifunction peripherals 100 have the same configuration.

Figure 3:
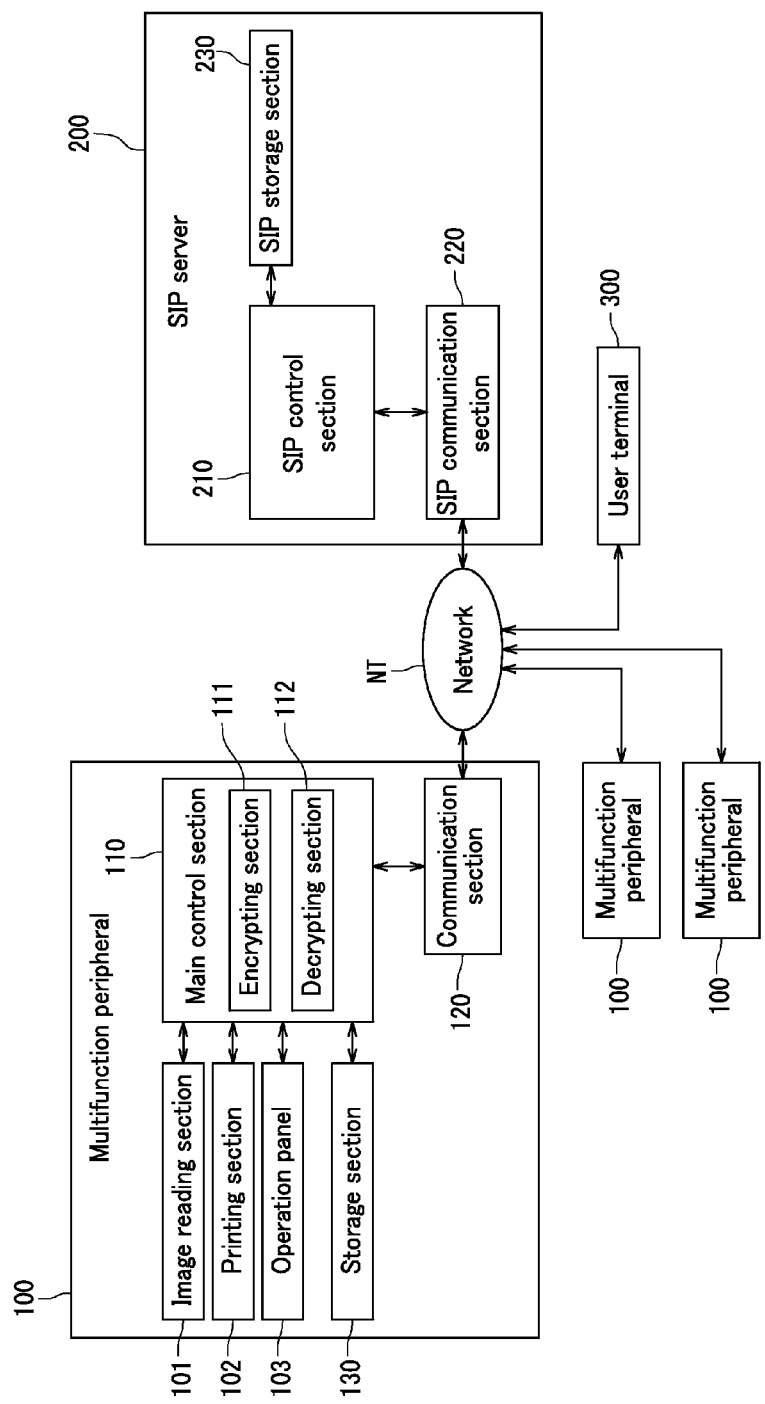
FIG. 3 is a diagram illustrating a hardware configuration of the multifunction peripheral and a SIP server that are included in the communication system according to one embodiment of the present disclosure.

Each of the multifunction peripherals 100 further includes a main control section 110, as illustrated in FIG. 3. The main control section 110 includes a CPU, an application specific integrated circuit (ASIC) for image processing, and a storage section (e.g., a ROM and/or a RAM) for storing programs and data for control. The main control section 110 performs overall control on the multifunction peripheral 100 based on the programs and data for control. For example, the main control section 110 performs various processing (e.g., zooming, density conversion, and data format conversion) on image data. The main control section 110 also controls a reading operation that the image reading section 101 performs and a printing operation that the printing section 102 performs. The main control section 110 further controls a display operation that the operation panel 103 performs and detects a user operation on the operation panel 103.

The main control section 110 is connected to a communication section 120 and the storage section 130. The communication section 120 receives an instruction from the main control section 110 and transmits to the SIP server 200 a communication request (a request for establishing a session) for communication with another multifunction peripheral 100 in the communication system CS. Once the session with the other multifunction peripheral 100 is established, the communication section 120 transmits and receives various types of data such as fax data to and from the other multifunction peripheral 100. The communication section 120 is further connected to a user terminal 300 such as a personal computer via the network NT.

The storage section 130 temporarily stores fax data as to-be-transmitted data (i.e., image data of an original document obtained through reading by the image reading section 101) and fax data received by the communication section 120. The storage section 130 stores various types of information including alternative address information and allowable period information, which will be described later. The storage section 130 further stores information on cipher keys (i.e., a public key and a secret key) employing an encrypting scheme, which will be described. Note that a site where data and information are stored is not limited specifically and a storage region dedicated to storage of fax data may be provided separately, for example.

The main control section 110 herein includes an encrypting section 111 and a decrypting section 112. The encrypting section 111 encrypts data. The decrypting section 112 decrypts encrypted data into original plaintext data. In the configuration as above, encrypted fax data can be received and transmitted through fax communication. Note that the encrypting scheme is not limited specifically and any known scheme may be employed such as an encrypting scheme using a public key or an encrypting scheme using a common key.

For example, in a configuration in which an encrypting scheme using a public key is employed as the encrypting scheme, a transmitter multifunction peripheral 100 (specifically, the encrypting section 111 thereof) encrypts to-be-transmitted data using a public key for encryption that is open to the general public. The transmitter multifunction peripheral 100 then transmits the to-be-transmitted data that is encrypted to a receiver multifunction peripheral 100. The receiver multifunction peripheral 100 (specifically, the decrypting section 112 thereof) decrypts the encrypted data into plaintext data using a secret key for decryption that corresponds to the public key (i.e., a key not open to the public). The transmitter and the receiver respectively perform encryption and decryption using different keys, that is, the public key and the secret key in the encrypting scheme using a public key. While on the other hand, the transmitter and the receiver perform encryption and decryption, respectively, in the encrypting scheme using a common key.

The SIP server 200 includes a SIP control section 210 to control operation of a SIP communication section 220 that performs communication with the multifunction peripherals 100. The SIP control section 210 is connected to a SIP storage section 230 that stores various information.

The SIP server 200 performs session establishing processing for establishing a session between multifunction peripherals 100. For example, in usual fax communication, a multifunction peripheral 100 that is to transmit fax data among the plurality of multifunction peripherals 100 serves as a communication requester to transmit a communication request to the SIP server 200. The SIP communication section 220 receives the communication request from the communication requester. The SIP control section 210 then specifies a specified device that a user of the communication requester specifies as a communication partner among the plurality of multifunction peripherals 100, in other words, specifies an IP address. The SIP control section 210 then performs processing for establishing a session between the communication requester and the communication partner.

Figure 4:
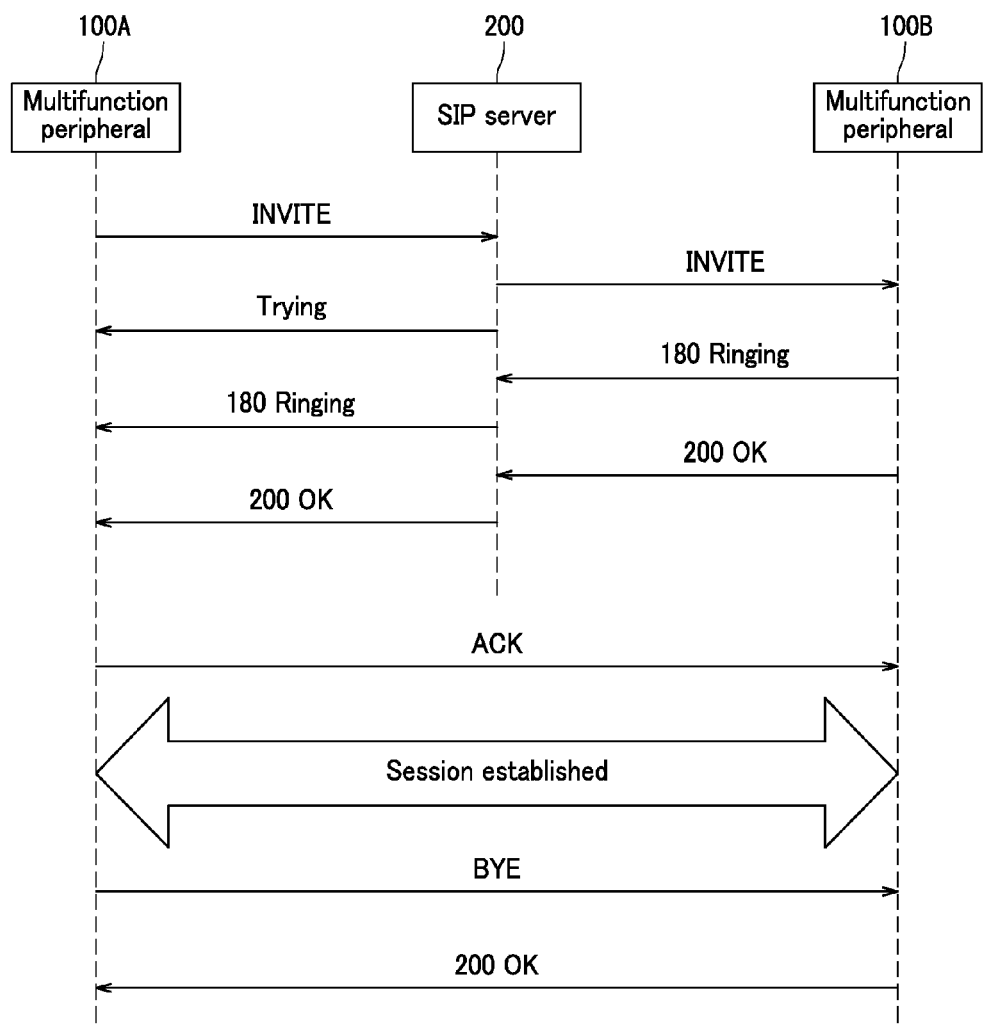
FIG. 4 illustrates a sequence that explains processing in usual fax communication in the communication system according to one embodiment of the present disclosure.

Detailed description will be made below with reference to the sequence illustrated in FIG. 4. Note that a multifunction peripheral 100 that is a communication requester and a multifunction peripheral 100 specified as a communication partner (i.e., a specified device) are referred to as a multifunction peripheral 100A and a multifunction peripheral 100B, respectively, in the following description.

The multifunction peripheral 100A first requests the SIP server 200 for communication with the multifunction peripheral 100B (INVITE request). Upon receiving the communication request from the multifunction peripheral 100A, the SIP server 200 transmits the communication request to the multifunction peripheral 100B (INVITE request). In addition, the SIP server 200 notifies the multifunction peripheral 100A that connection to the multifunction peripheral 100B is being tried (Trying response).

Upon receiving the communication request from the SIP server 200, the multifunction peripheral 100B notifies the multifunction peripheral 100A via the SIP server 200 that multifunction peripheral 100B is being rung (180Ringing response). Subsequently, the multifunction peripheral 100B notifies the multifunction peripheral 100A via the SIP server 200 that the multifunction peripheral 100B is ready for fax communication (200OK response). The multifunction peripheral 100A then notifies a multifunction peripheral 100B that the notification from the multifunction peripheral 100B is acknowledged (ACK response). As a result, a session is established between the multifunction peripherals 100A and 100B. Specifically, fax communication is enabled between the multifunction peripherals 100A and 100B so that to-be-transmitted fax data is transmitted from the multifunction peripheral 100A to the multifunction peripheral 100B. In other words, the multifunction peripheral 100B receives the fax data from the multifunction peripheral 100A.

When the fax communication is completed after the session is established, the multifunction peripheral 100A notifies the multifunction peripheral 100B of completion of the fax communication (BYE request). The multifunction peripheral 100B then transmits a response to the notification from the multifunction peripheral 100A (200OK response).

<Processing where Alternative Device is Communication Partner>

Figure 5:
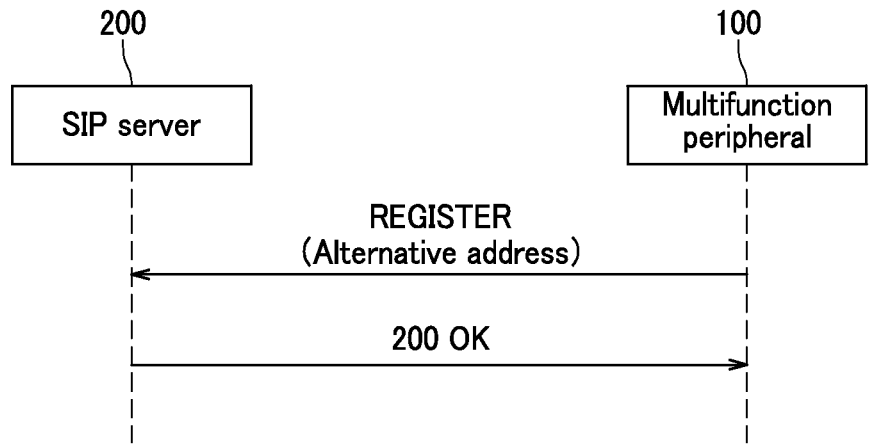
FIG. 5 illustrates a sequence that explains processing in registration of an alternative address (an address of an alternative device) in the communication system according to one embodiment of the present disclosure.

A user of each of the multifunction peripherals 100 as possible communication partners can set the multifunction peripheral 100 so that fax data from a communication requester is transferred to a multifunction peripheral 100 other than the user's multifunction peripheral 100. This setting is done by selecting a multifunction peripheral 100 as a transfer destination (hereinafter referred to as an alternative device) from the plurality of multifunction peripherals 100 and registering the alternative device (i.e., an alternative address corresponding to an address of the alternative device) to the SIP server 200. Specific description will be made below with reference to the sequence illustrated in FIG. 5.

In order to register an alternative device, a multifunction peripheral 100 as a registration requester (specifically, the communication section 120 thereof) transmits a registration request to the SIP server 200 (REGISTER request). The registration request includes alternative address information indicating an address of the alternative device as a registration target. Upon receiving the registration request, the SIP server 200 stores the alternative address information in association with the multifunction peripheral 100 as the registration requester. The SIP server 200 then notifies the multifunction peripheral 100 as the registration requester that registration is done successfully (200OK response).

Figure 6:
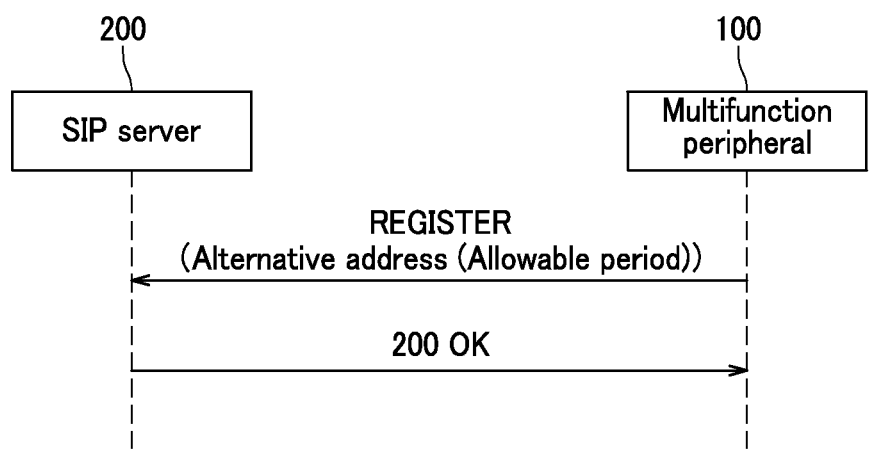
FIG. 6 illustrates a sequence that explains processing in registration of an allowable period (a period during which transfer is allowed) in the communication system according to one embodiment of the present disclosure.

A user of each of the multifunction peripherals 100 as possible communication partners can also register simultaneously with registration of the alternative device, an allowable period that is a period during which data transfer to the alternative device is allowed. In simultaneous registration of the alternative device and the allowable period, allowable period information indicating an allowable period is contained in the alternative address information, as illustrated in FIG. 6. The allowable period information is then stored in the SIP server 200.

Note that registration of the alternative device or both the alternative device and the allowable period may be requested from all or none of the multifunction peripherals 100.

In a situation in which the SIP server 200 already registers in advance an alternative device of a multifunction peripheral 100 specified as a communication partner (i.e., a specified device) when the SIP server 200 receives a communication request from a multifunction peripheral 100 as a communication requester, the SIP server 200 selects the alternative device as the communication partner and performs processing for establishing a session between the selected communication partner (i.e., the alternative device) and the communication requester.

Figure 7:
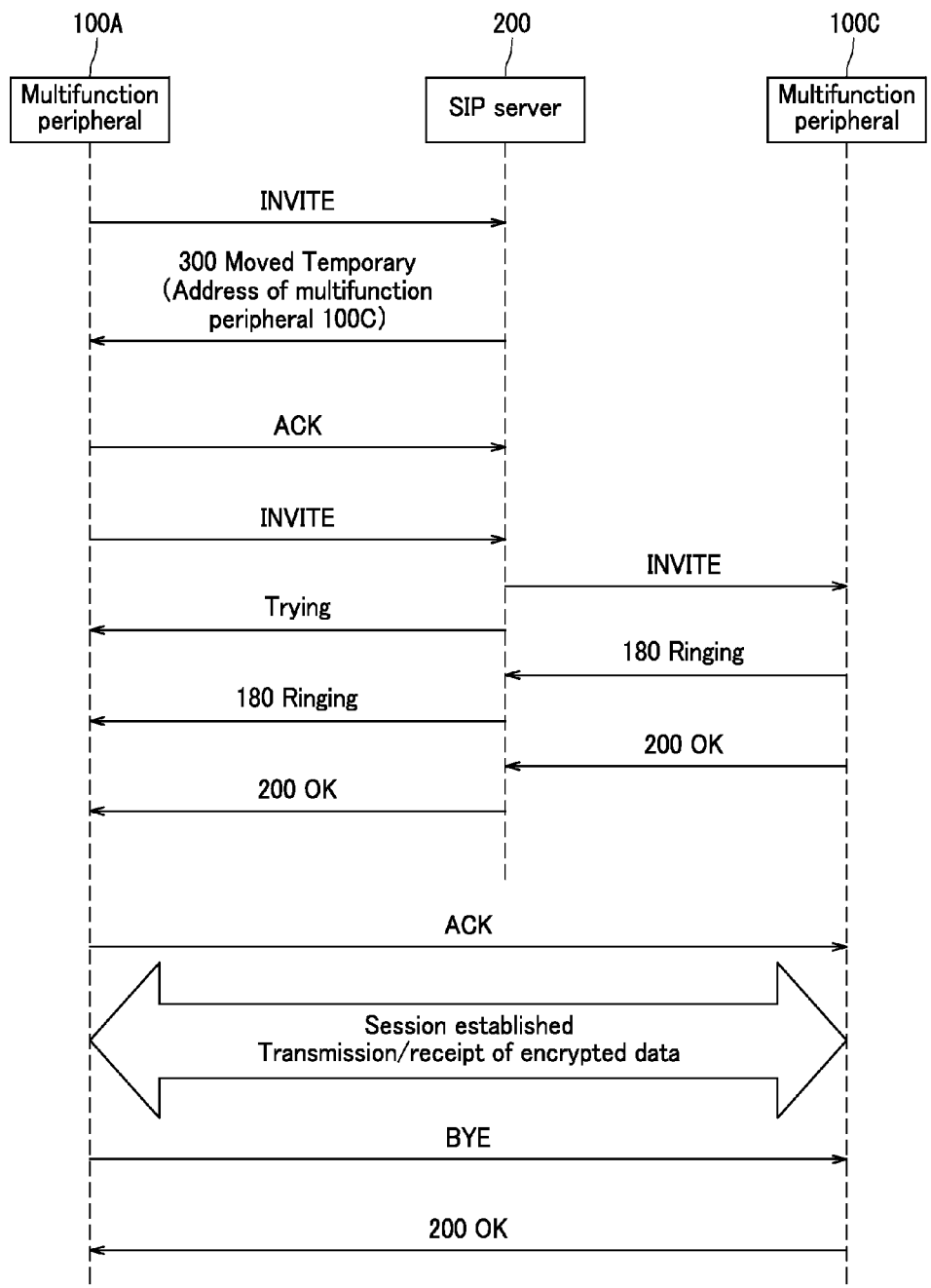
FIG. 7 illustrates a sequence that explains processing in fax communication with an alternative device as a communication partner in the communication system according to one embodiment of the present disclosure.

Specific description will be made below with reference to the sequence illustrated in FIG. 7. Note that multifunction peripherals 100A, 100B, and 100C represent a multifunction peripheral 100 as a communication requester, a multifunction peripheral 100 as a specified device specified as a communication partner, and a multifunction peripheral 100 registered as an alternative device of the multifunction peripheral 100B, respectively, in the following description.

The multifunction peripheral 100A first requests the SIP server 200 for communication with the multifunction peripheral 100B (INVITE request). Upon receiving the communication request from the multifunction peripheral 100A, the SIP server 200 then confirms whether or not an alternative device of the multifunction peripheral 100B is registered by referencing the alternative address information. In this example, the multifunction peripheral 100C is registered as the alternative device of the multifunction peripheral 100B. Accordingly, the SIP server 200 transmits to the multifunction peripheral 100A the alternative address information indicating the address of the multifunction peripheral 100C as the alternative device of the multifunction peripheral 100B (300MovedTemporary response). Note that in a situation in which an allowable period is registered as well as the multifunction peripheral 100C as an alternative device of the multifunction peripheral 100B, the alternative address information contains the allowable period information (see FIG. 8). Processing will be described later that is performed in a situation in which the alternative address information contains the allowable period information.

The multifunction peripheral 100A next notifies the SIP server 200 that the response from the SIP server 200 is acknowledged (ACK response). Note that a user may not desire data transfer to the multifunction peripheral 100C as an alternative device. Therefore, communication may be ended at this time point.

The multifunction peripheral 100A that has received the alternative address information transmits a communication request again to the SIP server 200 (INVITE request). Note that the communication request this time requests communication with the multifunction peripheral 100C as the alternative device of the multifunction peripheral 100B.

Upon receiving the communication request from the multifunction peripheral 100A, the SIP server 200 transmits the communication request to the multifunction peripheral 100C (INVITE request). In addition, the SIP server 200 notifies the multifunction peripheral 100A that connection to the multifunction peripheral 100C is being tried (Trying response).

The multifunction peripheral 100C that receives the communication request from the SIP server 200 notifies the multifunction peripheral 100A via the SIP server 200 that multifunction peripheral 100B is being rung (180Ringing response). Subsequently, the multifunction peripheral 100C notifies the multifunction peripheral 100A via the SIP server 200 that the multifunction peripheral 100C is ready for fax communication (200OK response). The multifunction peripheral 100A then notifies the multifunction peripheral 100C that the notification from the multifunction peripheral 100C is acknowledged (ACK response). As a result, a session is established between the multifunction peripherals 100A and 100C. In other words, fax communication is enabled between the multifunction peripherals 100A and 100C.

Once the session between the multifunction peripherals 100A and 100C is established, the main control section 110 of the multifunction peripheral 100A determines whether or not the multifunction peripheral 100C as the alternative device, which is to serve as a communication partner, satisfies a prescribed condition. Upon determining that the multifunction peripheral 100C satisfies the prescribed condition, the main control section 110 of the multifunction peripheral 100A (specifically, the encrypting section 111 thereof) encrypts fax data as to-be-transmitted data. The communication section 120 of the multifunction peripheral 100A then transmits the encrypted fax data to the multifunction peripheral 100C. Note that the prescribed condition will be described later in detail.

When the multifunction peripheral 100A transmits the encrypted fax data, the communication section 120 of the multifunction peripheral 100C as the alternative device receives the encrypted fax data. The storage section 130 of the multifunction peripheral 100C stores the encrypted fax data. The main control section 110 of the multifunction peripheral 100C (specifically, the decrypting section 112 thereof) decrypts the encrypted fax data into plaintext data after receipt of a user instruction. Thereafter, the main control section 110 of the multifunction peripheral 100C causes the printing section 102 to perform printing based on the fax data. In other words, the multifunction peripheral 100C does not perform printing based on the fax data until the multifunction peripheral 100C receives a user instruction after receipt of the encrypted fax data.

When the fax communication is completed, the multifunction peripheral 100A notifies the multifunction peripheral 100C of completion of the fax communication (BYE request). The multifunction peripheral 100C then transmits a response to the notification from the multifunction peripheral 100A (200OK response).

Description will be made next about the prescribed condition used for determination as to whether or not to-be-transmitted data is encrypted for transmission.

When the to-be-transmitted data that encrypted is and transmitted to the communication partner (i.e., the alternative device) from the communication requester is successfully decrypted in the communication partner (i.e., the alternative device), the communication partner (i.e., the alternative device) notifies the communication requester that data decryption has been done successfully. The communication requester that has received decryption-success notification records the communication partner (i.e., the alternative device) that transmits the decryption-success notification as a device that has performed decryption successfully.

For example, the storage section 130 of each of the multifunction peripherals 100 stores a success list. A multifunction peripheral 100 that receives decryption-success notification from an alternative device lists up identification information of the alternative device that transmits the decryption-success notification (e.g., an alternative address corresponding to an address of the alternative device). The main control section 110 of each of the multifunction peripherals 100 determines whether or not to encrypt to-be-transmitted data for transmission by referencing the success list stored in the multifunction peripheral 100.

Specifically, upon receiving the alternative address information from the SIP server 200, the multifunction peripheral 100 as the communication requester (specifically, the main control section 110 thereof) determines whether or not the alternative device as the communication partner is listed up in the success list in the multifunction peripheral 100 serving as the communication partner. That is, the multifunction peripheral 100 as the communication requester (specifically, the main control section 110 thereof) determines whether or not the alternative device of the communication partner is recorded as a device having performed decryption successfully.

Upon determining that the alternative device of the communication partner is not listed up in the success list therein, the multifunction peripheral 100 as the communication requester (specifically, the main control section 110 thereof) encrypts the to-be-transmitted data using a public key with the alternative device of the communication partner recognized as a device that satisfies the prescribed condition. In other words, in a situation in which the storage section 130 does not recorded the alternative device as a device in which data encryption has been successfully done, the encrypting section 111 encrypts the to-be-transmitted data. Thereafter, the multifunction peripheral 100 as the communication requester (specifically, the communication section 120 thereof) transmits the to-be-transmitted data that is encrypted.

By contrast, in a situation in which the alternative device of the communication partner is listed up in the success list therein, the multifunction peripheral 100 as the communication requester (specifically, the main control section 110 thereof) does not encrypt the to-be-transmitted data. The multifunction peripheral 100 as the communication requester (specifically, the communication section 120 thereof) transmits the to-be-transmitted data directly in the form of plaintext data. Note that an alternative device of a communication partner being listed up in the success list therein means that a user of the communication partner has a secret key for decryption that corresponds to the public key for encryption and is not an unspecified user. Accordingly, in a situation in which the alternative device of the communication partner is listed up in the success list in the multifunction peripheral 100, it is unnecessary to encrypt the to-be-transmitted data.

Figure 8:
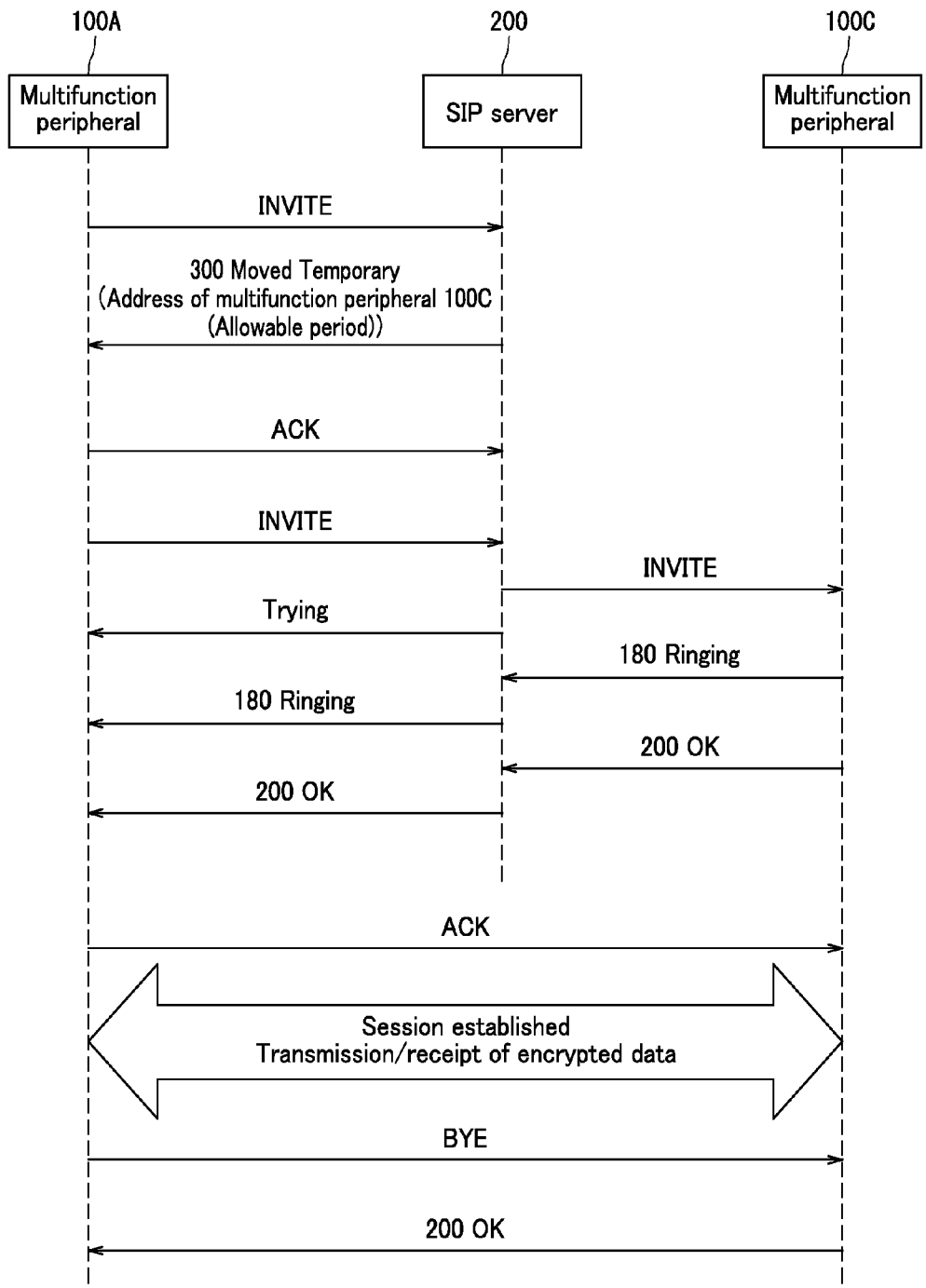
FIG. 8 illustrates a sequence that explains processing performed in a situation in which alternative address information contains allowable period information in the communication system according to one embodiment of the present disclosure.

As illustrated in FIG. 8, the alternative address information received from the SIP server 200 may contain allowable period information in another example. In such a situation, the multifunction peripheral 100 as the communication requester (specifically, the main control section 110 thereof) recognizes an allowable period indicated in the allowable period information. Note that a start point of the allowable period is a time point at which the SIP server 200 receives registration of an allowable period.

In order to transmit the to-be-transmitted data to the alternative device within the allowable period, the multifunction peripheral 100 as the communication requester (specifically, the communication section 120 thereof) transmits the to-be-transmitted data that is encrypted to the alternative device. By contrast, once the allowable period elapses, the multifunction peripheral 100 as the communication requester (specifically, the communication section 120 thereof) does not transmit the to-be-transmitted data to the alternative device. Accordingly, the to-be-transmitted data is transferred to the alternative device only within the allowable period registered by a user of the communication partner (i.e., a user of the specified device). Even in the configuration as above, the to-be-transmitted data transferred to the alternative device is also encrypted, thereby preventing leakage of the content of the transferred data to a third person.

Even in a situation in which the allowable period does not elapse yet in the sequence illustrated in FIG. 8, the to-be-transmitted data may not be transmitted within the allowable period and the communication request may be retransmitted to the SIP server 200 again after the allowable period elapses. In the configuration as above, no transmission of the to-be-transmitted data is performed. Therefore, leakage of data content to a third person can be prevented.

Incidentally, a user of each of the multifunction peripherals 100 as possible communication partners (i.e., specified devices) can set the multifunction peripheral 100 so that when to-be-transmitted data is transferred to an alternative device, notification of the transfer is transmitted to a contact address at which the user desires to receive the data (e.g., an address of a user terminal 300). This setting is done through inclusion of contact address information indicating a contact address at which the user desires to receive data into the alternative address information in the sequence illustrated in FIG. 5 or 6.

In a situation in which the alternative address information contains the contact address information, the multifunction peripheral 100 as the communication requester (specifically, the communication section 120 thereof) transmits after completion of transmission of the to-be-transmitted data to the alternative device, a notification indicating that transmission of the to-be-transmitted data to the alternative device is completed to the contact address indicated in the contact address information. In the configuration as above, the user of the communication partner can readily gasp transfer of the to-be-transmitted data to the alternative device, thereby enhancing convenience for the user of the communication partner (i.e., a user of the specified device in which the contact address is registered).

Alternatively, when the multifunction peripheral 100 as the communication requester receives the alternative address information containing the contact address information, the multifunction peripheral 100 as the communication requester may store the to-be-transmitted data without transmitting it to the alternative device and transmit to the contact address a notification indicating that the multifunction peripheral 100 as the communication requester stores the to-be-transmitted data. In the configuration as above, for example, a password and an ID necessary for polling reception may be transmitted to the contact address. As a result, a user of the communication partner (i.e., a user of the specified device in which the contact address is registered) can obtain the to-be-transmitted data from the multifunction peripheral 100 as the communication requester through polling reception.

Each of the multifunction peripherals 100 (communication devices) according to the present embodiment includes the communication section 120 and the encrypting section 111. The communication section 120 transmits a communication request to the SIP server 200 (communication control device) for communication with a specified device specified as a communication partner by a user of the communication device and transmits data to a communication partner with which a session is established through the session establishing processing. The encrypting section 111 encrypts the data to be transmitted by the communication section 120. When the communication section 120 receives from the SIP server 200 alternative address information indicating the address of an alternative device registered as a transfer destination after the communication request for communication with the specified device is transmitted to the SIP server 200, the communication section 120 determines the alternative device as the communication partner and transmits the to-be-transmitted data that is encrypted by the encrypting section 111 to the alternative device. The transfer destination indicates a transfer destination of the data to be transmitted to the specified device.

In the configuration according to the present disclosure, leakage of data content can be prevented in the alternative device in transfer of the to-be-transmitted data to the alternative device, thereby enhancing convenience for a user of the communication requester.

In the configuration according to the present disclosure, in a situation in which an alternative device is set as a communication partner, to-be-transmitted data to be transmitted to the alternative device is encrypted before transmission (transfer) of the to-be-transmitted data to the alternative device. In the configuration as above, even in a situation in which the alternative device as the communication partner is a device to which a user of the communication requester does not intend to transmit data, the content of the to-be-transmitted data can be prevented from leaking to a third person at the communication partner (i.e., the alternative device) because the to-be-transmitted data is encrypted. For this reason, no problem can be involved for the user of the communication requester even when the to-be-transmitted data is transmitted (i.e., transferred) to a device that the user does not intend to transmit the data. Even when the to-be-transmitted data is transmitted (i.e., transferred), it is unnecessary to make a request for canceling a transfer setting and re-operation for transmission of the to-be-transmitted data after the transfer unsetting, thereby enhancing convenience to the user of the communication requester.

As described above, upon the to-be-transmitted data that is encrypted being decrypted successfully in the alternative device, the storage section 130 records the alternative device as a device in which decryption has been done successfully in the present embodiment. In a situation in which the alternative device is specified as a communication partner in a subsequent session once the alternative device is recorded in the storage section 130 as a device having performed decryption successfully, the communication section 120 transmits to-be-transmitted data in unencrypted form to the alternative device. In the above configuration, the communication requester does not have to perform encryption, thereby enabling a quick start of transmission of the to-be-transmitted data. Further, the communication partner (i.e., the alternative device) does not have to perform decryption, thereby enabling simple and quick recognition of the content of the received data.

The embodiment disclosed herein is an example in all aspects and should not be taken to limit the present disclosure. The scope of the present disclosure is defined in the appended claims rather than the above embodiment, and any alterations can be made within the meaning and scope equivalent to those in the claims.

What is claimed is:

1. A communication device for connection via a network to a communication control device that performs session establishing processing for establishing a session between the communication device and a communication partner, the communication device comprising:
    a communication section configured to transmit a communication request to the communication control device for communication with a specified device specified as the communication partner by a user of the communication device and to transmit data to the communication partner with which a session is established through the session establishing processing;
    an encrypting section configured to encrypt the data to be transmitted by the communication section; and
    a storage section configured to store information therein, wherein
    when the communication section receives from the communication control device alternative address information indicating an address of an alternative device registered as a transfer destination after the communication request for communication with the specified device is transmitted to the communication control device, the communication section determines the alternative device as the communication partner and transmits the to-be-transmitted data that is encrypted by the encrypting section to the alternative device,
    the transfer destination indicates a transfer destination of the data to be transmitted to the specified device,
    when the alternative device successfully decrypts the to-be-transmitted data that is encrypted, the communication section receives decryption-success notification indicating that data decryption is successfully done from the alternative device,
    when the communication section receives the decryption-success notification from the alternative device, the alternative device is recorded in the storage section as a device having performed decryption successfully,
    when the communication section does not receive the decryption-success notification from the alternative device, the alternative device is not recorded in the storage section as a device having performed decryption successfully,
    when the alternative device is the communication partner for the communication device in a subsequent session once the alternative device is recorded as a device having performed decryption successfully, the communication section transmits the to-be-transmitted data in unencrypted form to the alternative device, and
    when the alternative device is not recorded in the storage section as a device having performed decryption successfully, the communication section transmits to the alternative device as the communication partner the to-be-transmitted data encrypted by the encryption section.

2. The communication device according to claim 1, wherein
    the alternative address information transmitted from the communication control device contains information indicating an allowable period,
    the allowable period is a period that starts from a time point of registration of the address of the alternative device and during which data transfer to the alternative device is allowed, and
    the communication section transmits the to-be-transmitted data that is encrypted by the encrypting section to the alternative device within the allowable period and does not transmit the to-be-transmitted data to the alternative device after the allowable period.

3. The communication device according to claim 1, wherein
    the alternative address information transmitted from the communication control device contains information indicating a contact address set by a user of the specified device, and
    when transmission of the to-be-transmitted data to the alternative device is completed, the communication section transmits to the contact address a notification indicating that transmission of the to-be-transmitted data to the alternative device is completed.

4. The communication device according to claim 1, wherein
    the communication section transmits a registration request to the communication control device for registration of an alternative device, and
    the registration request includes alternative address information indicating an address of the alternative device to be registered as a registration target.

5. The communication device according to claim 4, wherein
    the alternative address information included in the registration request contains allowable period information indicating an allowable period during which data transfer to the alternative device as the registration target is allowed.

6. The communication device according to claim 4, wherein
    the alternative address information included in the registration request contains information indicating a contact address of the user.

7. A communication system comprising:
    a communication control device configured to perform session establishing processing for establishing a session; and
    a communication device connected to the communication control device via a network, the communication device comprising:
        a communication section configured to transmit a communication request to the communication control device for communication with a specified device specified as a communication partner by a user of the communication device and to transmit data to the communication partner with which a session is established through the session establishing processing;
an encrypting section configured to encrypt the data to be transmitted by the communication section; and
a storage section configured to store information therein, wherein
when the communication section receives from the communication control device alternative address information indicating an address of an alternative device registered as a transfer destination after the communication request for communication with the specified device is transmitted to the communication control device, the communication section determines the alternative device as the communication partner and transmits the to-be-transmitted data that is encrypted by the encrypting section to the alternative device,
the transfer destination indicates a transfer destination of the data to be transmitted to the specified device,
when the alternative device successfully decrypts the to-be-transmitted data that is encrypted, the communication section receives decryption-success notification indicating that data decryption is successfully done from the alternative device,
when the communication section receives the decryption-success notification from the alternative device, the alternative device is recorded in the storage section as a device having performed decryption successfully,
when the communication section does not receive the decryption-success notification from the alternative device, the alternative device is not recorded in the storage section as a device having performed decryption successfully,
when the alternative device is the communication partner for the communication device in a subsequent session once the alternative device is recorded as a device having performed decryption successfully, the communication section transmits the to-be-transmitted data in unencrypted form to the alternative device, and
when the alternative device is not recorded in the storage section as a device having performed decryption successfully, the communication section transmits to the alternative device as the communication partner the to-be-transmitted data encrypted by the encryption section.

8. A communication device control method for controlling a communication device connected via a network to a communication control device that performs session establishing processing for establishing a session between the communication device and a communication partner, the communication device including a storage section configured to store information therein, the method comprising:
transmitting to the communication control device a communication request for communication with a specified device specified as the communication partner by a user of the communication device; and
transmitting to-be-transmitted data to the communication partner with which a session is established through the session establishing processing, wherein
when alternative address information indicating an address of an alternative device registered as a transfer destination is received from the communication control device after the communication request for communication with the specified device is transmitted to the communication control device, the transmitting to-be-transmitted data to the communication partner includes: determining the alternative device as the communication partner; and transmitting the to-be-transmitted data that is encrypted to the alternative device,
the transfer destination indicates a transfer destination of the data to be transmitted to the specified device,
the method further comprises:
receiving decryption-success notification indicating that data decryption is successfully done from the alternative device when the alternative device successfully decrypts the to-be-transmitted data that is encrypted;
recording the alternative device as a device having performed decryption successfully in the storage section when the communication section receives the decryption-success notification from the alternative device, and not recording the alternative device as a device having performed decryption successfully in the storage section when the communication section does not receive the decryption-success notification from the alternative device; and
in the transmitting to-be-transmitted data to the communication partner, the to-be-transmitted data in unencrypted form is transmitted to the alternative device when the alternative device is the communication partner for the communication device in a subsequent session once the alternative device is recorded as a device having performed decryption successfully,
in the transmitting to-be-transmitted data to the communication partner, the to-be-transmitted data encrypted by the encryption section is transmitted to the alternative device as the communication partner when the alternative device is not recorded in the storage section as a device having performed decryption successfully.

* * * * *